2,806,025
Patented Sept. 10, 1957

2,806,025
PRODUCTION OF CELLULOSE ALKYL ETHERS

Robert B. Darling, Hopewell, Va., assignor to Hercules Powder Company, Wilmington, Del., a corporation of Delaware No Drawing. Application October 15, 1953,
Serial No. 386,397

5 Claims. (Cl. 260—231)

This invention relates to an improved process for the production of cellulose alkyl ethers. In one of its aspects, this invention relates to an improved process for the production of ethyl cellulose.

Cellulose alkyl ethers, such as ethyl cellulose, can be produced commercially by reacting a cellulosic material, such as cotton linters, with an aqueous sodium hydroxide solution to form an alkali cellulose which is then reacted with ethyl chloride to form ethyl cellulose. The etherification reaction is usually effected in an autoclave at an elevated temperature, and, after the desired etherification has taken place, the reaction mixture is removed from the autoclave and the ethyl cellulose separated therefrom.

Heretofore the sodium hydroxide has been employed at a concentration of about 50%. At caustic solution concentrations above 74 weight percent, the melting point composition curve for the solutions exhibits a very steep slope rising about 85° C. per 5% increase in caustic concentration. For that reason, it has been deemed undesirable to employ concentrations in excess of about 70–72% because at higher concentrations the melting point of the caustic solution was above the optimum temperature employed which is generally within the range of about 110° to 150° C.

It is an object of this invention to provide a novel process for the etherification of cellulose.

It is another object of this invention to provide a novel process for the production of ethyl cellulose wherein the concentration of the caustic employed is higher than the concentrations employed prior to this invention.

It is another object of this invention to provide a novel process for the production of ethyl cellulose wherein an improved ethyl chloride efficiency is obtained.

It has been found that, if a minor amount of zinc oxide is added to the aqueous caustic solution that is employed for the production of alkyl cellulose ethers, higher concentrations of caustic solutions can be used, and at these higher caustic concentrations greatly improved ethyl chloride efficiencies are obtained.

The following examples demonstrate the practicality and desirability of this invention.

Examples 1–6

A series of runs was made to prepare ethyl cellulose in accordance with this invention. In each of five runs a sheet of cotton linters was dipped in an aqueous sodium hydroxide solution containing zinc oxide. Excess liquid was squeezed from the linters prior to charging to an autoclave. Ethyl chloride was also charged to the autoclave and the resulting mixture was heated through the following heat cycle:

(a) The mixture was heated to 110° C. in 2.5 hours.
(b) The mixture was maintained at 110° C. for 2 hours.
(c) The mixture was heated to 120° C. in 1 hour.
(d) The mixture was retained at 120° C. for 0.75 hour.

The mixture was subsequently cooled and ethyl cellulose recovered. The ethyl chloride efficiency was determined after titration of the residual caustic by the following formula:

$$\text{Ethyl chloride efficiency} = \frac{\text{Moles cellulose} \times \text{D. S.}}{\text{Moles caustic consumed}}$$

In a separate control run no zinc oxide was used and it was necessary to lower the concentration of the caustic solution to reduce its melting point for use in the above heat cycle. The heat cycle and ethyl chloride efficiency determinations for this run were similar to those above.

The observed data are shown in the table below. The charge is shown in parts by weight per part of cellulose (225 grams=1 part). D. S. indicates the degree of substitution attained in each run.

Table 1

| | Charge | | | | D. S. | Ethyl Chloride Efficiency, percent |
|---|---|---|---|---|---|---|
| | Sodium Hydroxide | Water | Ethyl Chloride | Zinc Oxide | | |
| Run 1 | 2.5 | 0.78 | 7.5 | 0.125 | 2.3 | 58 |
| Run 2 | 2.5 | 0.78 | 7.5 | 0.125 | 2.25 | 47 |
| Run 3 | 2.5 | 0.78 | 7.5 | 0.125 | 3.0 | 56 |
| Run 4 | 2.5 | 0.78 | 7.5 | 0.125 | 2.9 | 52 |
| Run 5 | 2.5 | 0.78 | 7.5 | 0.125 | 3.0 | 55 |
| Run 6 | 2.4 | 1.0 | 7.5 | -------- | 2.35 | 26 |

The above data demonstrate the marked improvement in ethyl chloride efficiency that can be obtained by practicing this invention. The data also demonstrate that the presence of the zinc oxide in the caustic solution makes it possible to use comparatively high strength caustic solutions in the etherification of cellulose.

While the above examples have shown the use of cotton linters as the cellulosic material in the etherification process, cellulose from other sources, such as wood pulp, bagasse, flax, jute, ramie, and the like, can be used. However, for most purposes, cotton linters are preferred.

The alkylating agent used can be an alkyl halide or an alkyl sulfate and preferably an alkyl chloride. Thus, for example, the alkylating agent can be methyl chloride, dimethyl sulfate, ethyl chloride, ethyl bromide, diethyl sulfate, propyl chloride, propyl bromide, butyl bromide, butyl chloride, and the like. An alkylating agent will, of course, be chosen which contains the alkyl group that is desired in the cellulose ether, and it will be found that the method described in accordance with this invention is applicable to and highly advantageous in the production of any of the alkyl cellulose ethers. Cellulose ethers which can be prepared in accordance with this invention are methyl cellulose, ethyl cellulose, propyl cellulose, butyl cellulose, and the like. The amount of alkylating agent used may vary within rather wide limits. In preparing an alkyl cellulose ether having a good solubility in the common organic solvents, it is preferred to use an excess of alkylating agent. For example, from 4 to 12 parts by weight of alkylating agent per part of cellulose unit can be used. The alkylating agent serves not only as a reactant but also as a medium for the reaction, and a large portion of the excess alkylating agent can be recovered unchanged at the end of the process. The excess alkylating agent can be replaced by an organic solvent, such as alcohols, ethers, and hydrocarbons. Typical of the alcohols that can be used are methanol, ethanol, n-propanol, isopropanol, and the like. To avoid the formation of a large number of by-products, it is preferred to use an organic solvent having the same alkyl group as that contained in the alkylating agent. The time required to complete the reaction in the presence of such solvent is usually greater than when an excess of the alklating agent serves as a medium for the reaction.

Sodium hydroxide is the alkali ordinarily employed in the process, but, if desired, other alkali metal hydroxides can be used either singly or in combination. The amount of sodium hydroxide that is used is variable and generally a parts-by-weight ratio of cellulose to caustic within the range of 1.5 to 4.0 is used depending upon the degree of substitution desired in the etherification product. The concentration of the sodium hydroxide that is employed in this process is in excess of that generally used in the prior art procedures. In practicing this invention, the aqueous sodium hydroxide solution has a minimum concentration of about 75% by weight, and, although higher concentrations can be used, the maximum concentration is generally not substantially in excess of about 80%. The caustic solution containing the zinc oxide of this invention can be mixed with the cellulose by dipping or otherwise contacting the cellulose and caustic prior to introduction to the reaction vessel. This procedure has been described in the above specific examples. On the other hand, the cellulose, caustic solution containing zinc oxide, and etherifying agent can be introduced to the autoclave, and after a period of heating, the etherification reaction proceeds.

When using an alkyl chloride as the alkylating agent, it is preferred that the etherification reaction be carried out in an autoclave provided with a stirrer or constructed for rotating or tumbling motion to provide agitation. The cellulose can be thoroughly wetted with the caustic solution containing zinc oxide, and the wetted cellulose is then introduced to the autoclave. Ethyl chloride can be added to the autoclave either prior or subsequent to the introduction of the wetted cellulose. After all the ingredients of the alkylation reaction mixture have been introduced to the autoclave, it is heated either rapidly or gradually to reaction temperature. It is usually advantageous to heat the reaction mixture gradually and the above examples provide a heating cycle that has been found to be quite effective. A reaction temperature is determined largely by the reactivity and the amount of alkylating agent that is used. Thus, when using ethyl chloride as the alkylating agent, a temperature within the range of about 90° C. to 150° C., and preferably within the range of 100° C. to 130° C., can be used. The higher the reaction temperature the more rapid the reaction, while the lower temperatures result in greater uniformity of product. The reaction time is generally within the range of 3 to 15 hours.

The presence of the zinc oxide in the comparatively highly concentrated caustic solution is an important feature of this invention. If the cellulose is dipped or otherwise contacted with caustic prior to introduction to the autoclave, it is preferred that the caustic solution used for dipping contain the zinc oxide. On the other hand, if the caustic solution is introduced separately to the reaction autoclave, it is preferred that the caustic introduced in this manner contain the zinc oxide. The above specific examples demonstrate the effectiveness of a caustic solution containing 5% by weight of zinc oxide based on the caustic. However, the zinc oxide concentration of the caustic solution can vary from about 2.5 to about 10%. Since effective results and a marked improvement over the prior art can be obtained with a 5% zinc oxide concentration in caustic solution, it is usually unnecessary to employ a higher concentration.

What I claim and desire to protect by Letters Patent is:

1. In a process for producing an alkyl cellulose ether wherein cellulose is reacted with an aqueous alkali metal hydroxide solution to form an alkali cellulose and the resulting alkali cellulose is reacted with an alkylating agent to form an alkyl cellulose ether, the improvement which comprises employing an aqueous alkali metal hydroxide solution having a concentration not lower than 75% by weight and containing from 2.5% to 10% by weight of zinc oxide based on said alkali metal hydroxide in said process.

2. In a process for producing an alkyl cellulose ether wherein cellulose is reacted with an aqueous sodium hydroxide solution to form alkali cellulose and the resulting alkali cellulose is reacted with an alkyl halide to form an alkyl cellulose ether, the improvement which comprises employing an aqueous sodium hydroxide solution having a concentration not lower than 75% by weight and containing from 2.5% to 10% by weight of zinc oxide based on said sodium hydroxide in said process.

3. In a process for producing ethyl cellulose wherein cellulose is reacted with an aqueous sodium hydroxide solution to form alkali cellulose and the resulting alkali cellulose is reacted with ethyl chloride to form ethyl cellulose, the improvement which comprises employing an aqueous sodium hydroxide solution having a concentration of about 75% to 80% by weight and containing from 2.5% to 10% by weight of zinc oxide based on said sodium hydroxide in said process at a temperature within the range of 90° to 150° C.

4. A process for producing ethyl cellulose which comprises dipping sheeted cellulose in an aqueous solution of sodium hydroxide having a concentration of about 75% to 80% by weight and containing from 2.5% to 10% by weight of zinc oxide, removing excess solution from the dipped cellulose, and reacting the resulting product with ethyl chloride at a temperature within the range of 90° to 150° C. to form ethyl cellulose.

5. A process for producing ethyl cellulose which comprises contacting cellulose, an aqueous sodium hydroxide solution having a concentration of about 75% to 80% by weight and containing from 2.5% to 10% by weight of zinc oxide, and ethyl chloride in a reaction zone at a temperature of 90° to 150° C., and recovering ethyl cellulose from the resulting product.

References Cited in the file of this patent

UNITED STATES PATENTS

| | | |
|---|---|---|
| 1,805,365 | Huber | May 12, 1931 |
| 1,813,665 | Seel et al. | July 7, 1931 |
| 2,265,918 | Lilienfeld | Dec. 9, 1941 |
| 2,362,900 | Groombridge et al. | Nov. 14, 1944 |
| 2,381,972 | Dreyfus | Aug. 14, 1945 |
| 2,553,695 | Wilcox et al. | May 22, 1951 |